US012561457B2

(12) United States Patent　(10) Patent No.:　US 12,561,457 B2

Takijiri　(45) Date of Patent:　Feb. 24, 2026

(54) DEVICE MANAGEMENT SERVER STORING ASSOCIATION INFORMATION ASSOCIATING USER IDENTIFICATION INFORMATION WITH DEVICE INFORMATION

(71) Applicant: BROTHER KOGYO KABUSHIKI KAISHA, Nagoya (JP)

(72) Inventor: Yutaka Takijiri, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 73 days.

(21) Appl. No.: 18/507,649

(22) Filed: Nov. 13, 2023

(65) Prior Publication Data

US 2024/0193285 A1　Jun. 13, 2024

(30) Foreign Application Priority Data

Dec. 13, 2022　(JP) ................................. 2022-198697

(51) Int. Cl.
G06F 21/60　(2013.01)
(52) U.S. Cl.
CPC .................................. G06F 21/604 (2013.01)
(58) Field of Classification Search
CPC ........... G06F 21/604; G06F 21/62–629; H04L 63/102; H04N 2201/0094
See application file for complete search history.

(56) References Cited

U.S. PATENT DOCUMENTS

| | | | |
|---|---|---|---|
| 2012/0150695 A1* | 6/2012 | Fan ......................... | G06Q 30/02 |
| | | | 705/27.1 |
| 2018/0147487 A1* | 5/2018 | Beppu ................... | A63F 13/352 |
| 2023/0093971 A1 | 3/2023 | Takijiri | |

FOREIGN PATENT DOCUMENTS

| | | |
|---|---|---|
| JP | 2021-068372 A | 4/2021 |
| JP | 2023-051189 A | 4/2023 |

* cited by examiner

*Primary Examiner* — Kevin Bechtel
(74) *Attorney, Agent, or Firm* — Scully, Scott, Murphy & Presser, P.C.

(57)　ABSTRACT

In a device management server, when a setup request is received together with user identification information and device identification information, a controller determines whether first association information is stored in a storage. The first association information associating the user identification information with first device information that includes the device identification information and first service information. When the first association information is stored, the controller stores second association information associating the user identification information with second device information. The second device information includes second service information the same as the first service information. When the first association information is not stored and the device identification information is stored, the controller stores third association information associating the user identification information with third device information. The third device information includes third service information that includes first part of the first service information but excludes second part of the first service information.

7 Claims, 13 Drawing Sheets

DEVICE MANAGEMENT SERVER STORING ASSOCIATION INFORMATION ASSOCIATING USER IDENTIFICATION INFORMATION WITH DEVICE INFORMATION

REFERENCE TO RELATED APPLICATIONS

This application claims priority from Japanese Patent Application No. 2022-198697 filed on Dec. 13, 2022. The entire content of the priority application is incorporated herein by reference.

BACKGROUND ART

A conventional system known in the art stores a permitted printing quantity on a printer and subtracts the number of sheets used in printing from the permitted printing quantity, whereby the user can continue using a printing service for the printer by paying a fixed rate for a given period of time.

DESCRIPTION

While the above conventional technology describes device replacements and the accompanying transfers of data, this description is limited to cases in which the users of the new and old devices are the same. In other words, the conventional technology does not consider cases in which a device is being set up by a new user different from the former user, such as when a device is being reused or when ownership of the device has been transferred. Consequently, if all data is transferred when ownership of the device is transferred, there is potential for the unauthorized use of the former user's data by the new user.

In view of the foregoing, it is an object of the present disclosure to provide a technology capable of preventing unauthorized use of data when a user of a device is changed while making device management less complex.

In order to attain the above and other objects, according to one aspect, the present disclosure provides a device management server. The device management server includes a network interface, a storage, and a controller. The network interface is communicable with a device via a network. The controller is configured to perform: when a setup request for a setup is received together with user identification information for a user that has instructed to issue the setup request and device identification information for a device via the network interface, a determining process to determine whether first association information is stored in the storage, the first association information associating the user identification information with first device information, the first device information including the device identification information and first service information, the first service information being related to a provision of a service for the device; when the determining process determines that the first association information is stored in the storage, a first process to store second association information in the storage, the second association information associating the user identification information with second device information for the device, the second device information including second service information the same as the first service information; and when the determining process determines that the first association information is not stored in the storage and the device identification information is stored in the storage, a second process to store third association information in the storage, the third association information associating the user identification information with third device information for the device, the third device information including third service information, the third service information including first part of the first service information but excluding second part of the first service information.

According to another aspect, the present disclosure provides a device management system. The device management system includes a device, and a server. The device includes a first controller, a first storage, a first network interface, and an input interface. The first storage stores settings information for the device. The first network interface is communicable with a network. The input interface is configured to receive instructions to the device. The server includes a second controller, a second storage, and a second network interface. The second network interface is communicable with the device via the network. The first controller is configured to perform: when a setup instruction to perform a setup for the device is received from a user via the input interface, transmitting, to the server via the first network interface, a setup request for the setup together with user identification information for the user and device identification information for the device. The second controller is configured to perform: when the setup request is received together with the user identification information and the device identification information via the second network interface, a determining process to determine whether first association information is stored in the storage, the first association information associating the user identification information with first device information, the first device information including the device identification information and first service information, the first service information being related to a provision of a service for the device; when the determining process determines that the first association information is stored in the storage, a first process to store second association information in the storage, the second association information associating the user identification information with second device information for the device, the second device information including second service information the same as the first service information; and when the determining process determines that the first association information is not stored in the storage and the device identification information is stored in the storage, a second process to store third association information in the storage, the third association information associating the user identification information with third device information for the device, the third device information including third service information, the third service information including first part of the first service information but excluding second part of the first service information.

According to still another aspect, the present disclosure provides a non-transitory computer readable storage medium storing a set of program instructions for a data management server, the data management server including a network interface communicable with a device via a network, a storage, and a controller. The set of program instructions when executed by the controller causing the data management server to perform: when a setup request for a setup is received together with user identification information for a user that has instructed to issue the setup request and device identification information for a device via the network interface, a determining process to determine whether first association information is stored in the storage, the first association information associating the user identification information with first device information, the first device information including the device identification information and first service information, the first service information being related to a provision of a service for the device; when the determining process determines that the first association information is stored in the storage, a first process to store second association information in the storage, the second association information associating the user identification information with second device information for the device, the second device information including second service information the same as the first service information; and when the determining process determines that the first association information is not stored in the storage and the device identification information is stored in the storage, a second process to store third association information in the storage, the third association information associating the user identification information with third device information for the device, the third device information including third service information, the third service information including first part of the first service information but excluding second part of the first service information.

In the above structure, when a user of a device is changed, unauthorized use of data by the new user can be suppressed and the complexity of data management can be reduced.

Figure 1:
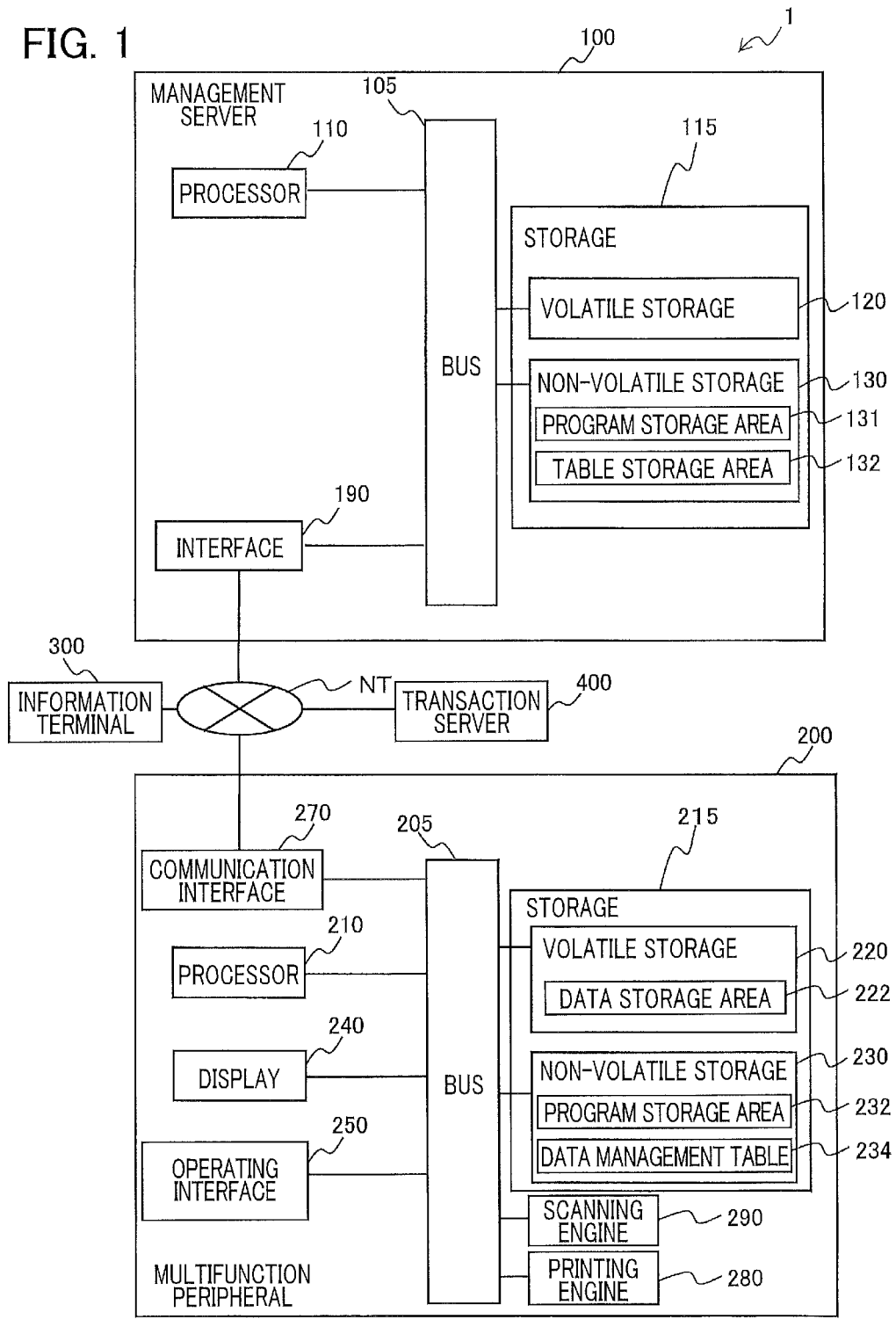
FIG. 1 is a block diagram illustrating entire structure of a device management system.

FIG. 1 illustrates a printing system 1 according to one embodiment of the present disclosure. In the present embodiment, the printing system 1 provides a prepaid printing service in which users, i.e., customers can use the printing function of a multifunction peripheral 200 by paying a fee. The printing system 1 is an example of a device management system.

<1. Outline of Printing System>

FIG. 1 is a block diagram illustrating an entire configuration of the printing system 1. The printing system 1 illustrated in FIG. 1 includes a management server 100, the multifunction peripheral (MFP) 200, an information terminal 300, and a transaction server 400. The management server 100, the multifunction peripheral 200, the information terminal 300, and the transaction server 400 are interconnected over a network NT to communicate with each other.

<1-1. Management Server>

The management server 100 is a server that is installed and managed by the manufacturer of the multifunction peripheral 200, for example. The management server 100 includes a processor 110, a storage 115, and an interface 190. The processor 110, the storage 115, and the interface 190 are interconnected via a bus 105.

The storage 115 includes a volatile storage 120, and a nonvolatile storage 130. The volatile storage 120 is a DRAM. The volatile storage 120 stores therein data for managing the multifunction peripheral 200. The nonvolatile storage 130 is a hard disk drive or a solid state drive, for example. The nonvolatile storage 130 has a program storage area 131 and a table storage area 132 for storing a data management table. The contents stored in these storages will be described later in detail.

The data management table 132 stores user identification information and device information in a manner that the user identification information is associated with the device information. The device information includes multifunction-peripheral identification information (hereinafter, referred to as MFP identification information) for identifying the multifunction peripheral 200, and service information on services provided for the multifunction peripheral 200. The device information includes information on a logical device LD and information on a physical device PD, described later. The nonvolatile storage 130 is an example of the storage and the example of the second storage.

The processor 110 is a device that performs data processing. The processor 110 is a CPU, for example. By executing a program stored in the program storage area 131, the processor 110 executes various processes illustrated in FIG. 13 and the like described later, including processes for performing data communications with the information terminal 300, the multifunction peripheral 200, and the transaction server 400 which are connected to the network NT. The program stored in the program storage area 131 and the processor using this program are examples of the controller and examples of the second controller.

The interface 190 is a wired interface or a wireless interface for communicating with other devices. The interface 190 is connected to the network NT via a wide-area communication interface (not illustrated). The interface 190 is an example of the communication interface and the network interface and an example of the second communication interface and the second network interface.

<1-2. Transaction Server>

The transaction server 400 is a server that is installed at a company that provides various online services for settling online payments, for example. Although not illustrated in the drawings, the transaction server 400 includes a processor, a storage, and an interface for connecting to the network NT.

<1-3. Multifunction Peripheral>

The multifunction peripheral 200 is owned by a service provider that provides the printing service described above, for example. The multifunction peripheral 200 is an example of the device and the specific device. The multifunction peripheral 200 includes a scanning engine 280, a printing engine 290, a processor 210, a storage 215, a display 240, an operating interface 250 that the user can operate, and a communication interface 270. The scanning engine 280, the printing engine 290, the processor 210, the storage 215, the display 240, the operating interface 250, and the communication interface 270 are interconnected via a bus 205.

The storage 215 includes a volatile storage 220, and a nonvolatile storage 230. The volatile storage 220 is DRAM, for example. The volatile storage 220 has a data storage area 222 for storing image data. The nonvolatile storage 230 is flash memory, for example. The nonvolatile storage 230 has a program storage area 232 and a data management table 234. The program storage area 232 stores, as firmware, various programs including a print control program related to print execution, for example.

The data management table 234 stores configuration information for the multifunction peripheral 200 and other various information. The configuration information includes MFP identification information. The MFP identification information includes as an invariable product ID for the multifunction peripheral 200, and a variable device ID that is changed with each reset of the multifunction peripheral

200. The nonvolatile storage 230 is an example of the first storage. The MFP identification information is an example of the device identification information. The product ID is an example of the first device identification information. The device ID is an example of the second device identification information.

The processor 210 is a device that performs data processing. The processer 210 is a CPU, for example. The processer 210 executes the various program stored in the program storage area 232 for controlling processes. The processor 210 can cause the printing engine 290 to print images based on image data transmitted from the information terminal 300. The various programs stored in the program storage area 232 and the processor 210 using these programs are examples of the first controller.

The display 240 is a liquid crystal display, for example. The operating interface 250 is a device that receives user operations to the multifunction peripheral 200. By operating the operating interface 250, the user can input various instructions into the multifunction peripheral 200. The communication interface 270 is a wired or wireless network interface for communicating with other devices such as the management server 100 via the network NT. The communication interface 270 is connected to the network NT via a wide-area communication interface (not illustrated). The operating interface 250 is an example of the input interface. The communication interface 270 is an example of the first communication interface.

The scanning engine 280 is configured to optically read a scanning target such as a document using photoelectric conversion elements such as a CCD or a CMOS, and to generate scan data representing an image of the read scanning target.

The printing engine 290 is configured to pick up a sheet from a feed tray and to print an image on the sheet according to a prescribed method while conveying the sheet using a conveying mechanism (not illustrated). The following specification describes a case in which the printing engine 290 performs printing according to an inkjet method.

<1-4. Information Terminal>

The information terminal 300 in the present embodiment is an information terminal (terminal device) such as a desktop personal computer, a tablet computer, or a smartphone possessed by the user. For example, the information terminal 300 is connected to the network NT through wireless communication. Although not illustrated in the drawings, the information terminal 300 includes a processor, a storage, and an interface for connecting to the network NT. For example, the processor of the information terminal 300 utilizes an operating system (OS) provided with universal printing capabilities, such as Mopria and AirPrint. An application program used for utilizing the printing service described above is preinstalled in the information terminal 300. The application program is executed and developed on the OS. Note that other types of information terminal may be used as the information terminal 300.

<2. Logical Devices and Physical Devices>

The printing system 1 according to the present embodiment described above provides a prepaid printing service in which users pay a fee to use the printing functions of the multifunction peripheral 200. Specifically, users (i.e., customers) can use the printing service provided on the printing system 1 according to a service agreement. The printing service can be used with a multifunction peripheral 200 possessed by the provider of the printing service or purchased by the user. In the printing service, the user prepurchases via the mobile terminal 300 authorization to print a prescribed number of permitted printing sheets on the multifunction peripheral 200. In other words, a pay-as-you-go system is employed in the printing service in which the user can print only the prescribed number of permitted printing sheets stipulated in the specific printing service that the user has ordered. In this system, the management server 100 directly receives an order for a printing service from the mobile terminal 300, the transaction server 400 indirectly handles an online payment for that order, and the printing service is applied to the multifunction peripheral 200 once payment has been settled.

Figure 2:
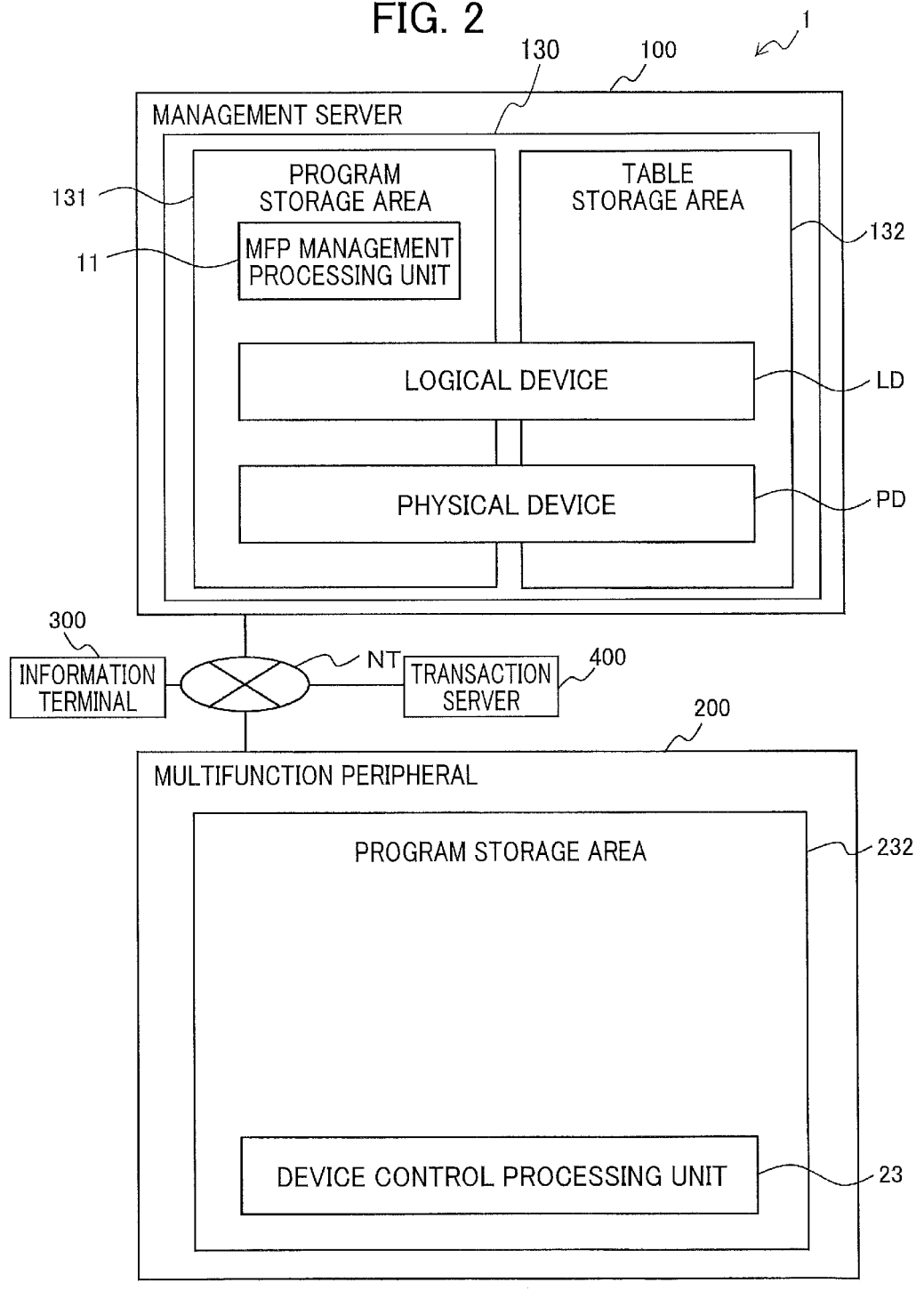
FIG. 2 is a block diagram illustrating functional configuration of a management server and a multifunction peripheral.

As shown in FIG. 2, the management server 100 has a program corresponding to an MFP management processing unit 11 that defines, as virtual devices, logical devices LD and physical devices PD, whose data is stored in the nonvolatile storage 130. Here, each of the logical devices LD and the physical device PD is a combination of the software running on the MFP management unit 11 and corresponding data or information stored in the nonvolatile storage 130. The MFP management processing unit 11 comprehensively manages information on each of a plurality of multifunction peripherals 200 for which the management server 100 is responsible. The logical device LD performs processes in response to printing service orders issued by contracted users of a multifunction peripheral 200 and manages service information related to service provision for the multifunction peripherals 200. The physical device PD manages the consumables and mechanical status, such as abnormalities, for a multifunction peripheral 200.

The multifunction peripheral 200 is provided with a program corresponding to a device control processing unit 23. The device control processing unit 23 performs processes related to basic device control, such as printing operations, input operations, and displays on the multifunction peripheral 200.

Figure 3:
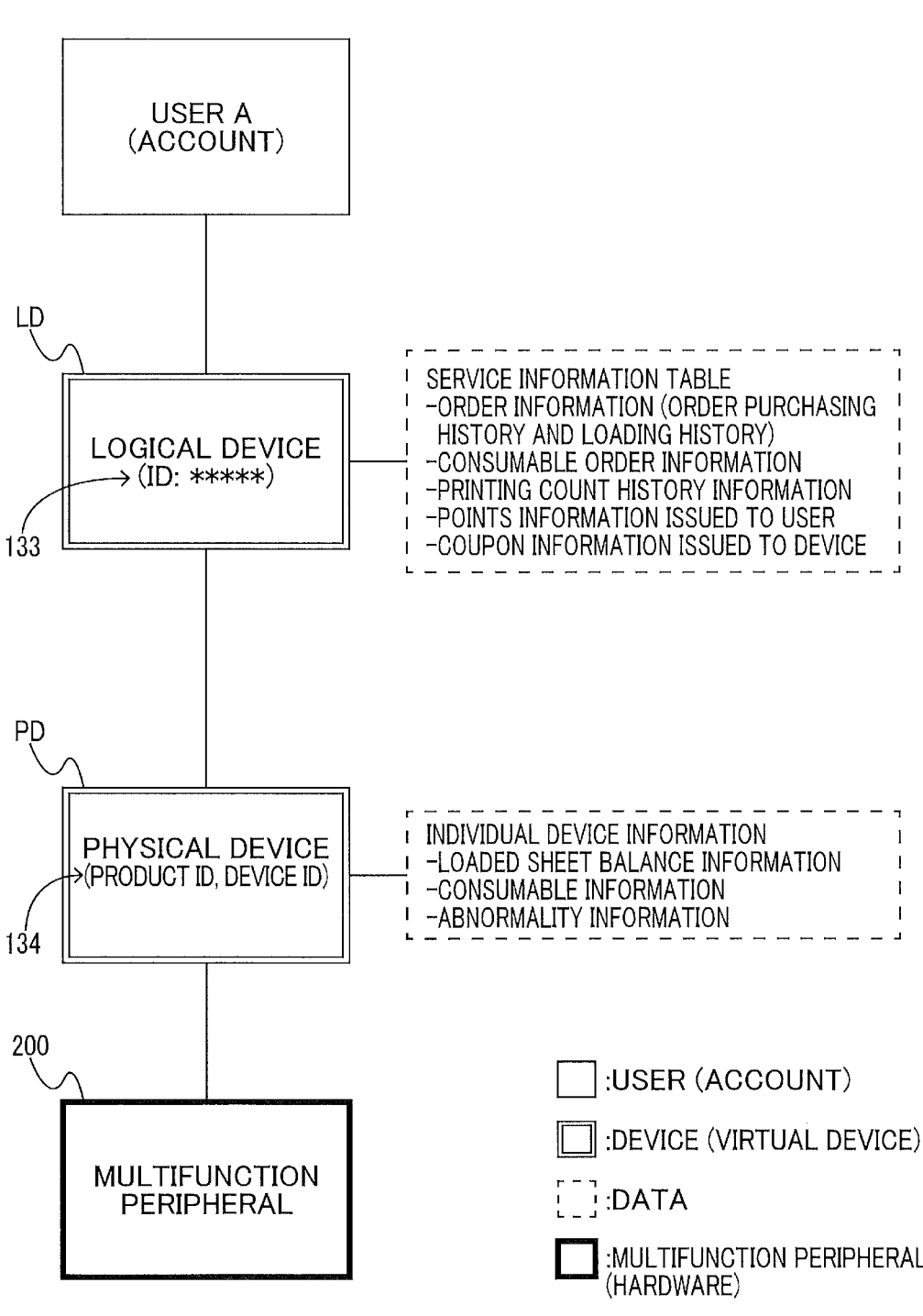
FIG. 3 is an explanatory diagram illustrating association between a logical device and a physical device.

FIG. 3 shows one sample configuration of specific associations with the logical device LD and the physical device PD. The logical device LD is individually identified by ID information 133, which is randomly set and assigned to each service contract. The account of a contracted user registered on the management server 100 is associated with the logical device LD. The account is an example of the user identification information. Users can be associated with logical devices LD in various combinations that are switchable. For example, the data management table 132 stores information on association (hereinafter, referred to as user-logical device association information) that associates the information on the account (user identification information) with the ID information 133 and the service information. MFP identification information 134 is recorded in the physical device PD for identifying an individual multifunction peripheral 200 subject to management. The MFP identification information 134 includes the aforementioned product ID and device ID, for example. Detection information for the online status may also be recorded in the physical device PD. The detection information indicates whether the corresponding multifunction peripheral 200 is currently in a normal operating state or a malfunctioning state. A single multifunction peripheral 200 is always permanently associated one-on-one with the physical device PD while operating normally, so that the mechanical status of the multifunction peripheral 200 can be referenced in real-time. Each physical device PD can be associated with any one of the logical devices LD according to a specified combination. That is, association between the physical device PD and the logical device is changeable. The data management table 132 stores information on the association between the logical device LD and the physical device PD (hereinafter, referred to as the logical-physical association information).

The logical device LD and physical device PD are used for managing data for their respective processes. The logical device LD manages service information related to service provision for the multifunction peripheral 200 associated with the logical device LD in a data table. Some specific examples of the service information being managed are order information, consumable order information, printing count history information, points information, and coupon information. In this example, the user can order selected one of a plurality of service plans that charge 100 yen for 100 pages (sheets), 250 yen for 300 pages (sheets), and the like. When ordering a service plan, the user is also awarded service points equivalent to a certain percentage of the cost of the order. Coupons worth a certain amount of money are also issued to provide printing benefits free of charge at promotional events and the like. In the printing service described above, information on the user's order purchasing history and loading history is managed as order information; information on service points is managed as points information; and information on coupons is managed as coupon information. Here, the loading history indicates history of loaded amounts, such as, amounts of permitted printing sheets that are loaded for the multifunction peripheral 200. The consumable order information is used to manage details of the user's past orders for consumables, such as ink and ink cartridges used in the multifunction peripheral 200. The printing count history information is used to manage the number of sheets (printing count) that have been printed under this printing service from the number of permitted printing sheets loaded for the multifunction peripheral 200.

The order information includes personal information such as the name, address, and payment information of users who have placed orders. The consumable order information includes personal information, such as order IDs and shipping destination information. Further, each of the points information or coupon information includes validity information indicating a period of use or conditions for use. One example of a condition for use is an invalid state for a coupon that can be used for a certain number of times. When the coupon has been used the certain number of times, the condition for use for this coupon becomes the invalid state indicating that the coupon can no longer be used.

In addition to the use of prepaid orders and coupons as described above, the printing service offers a tutorial loading as one form of loading permitted printing sheets for the multifunction peripheral 200. The tutorial loading is a one-time loading authorization that can be applied either free-of-charge or at a substantial discount for business purposes, such as helping first-time users of the multifunction peripheral 200 learn how to perform loading operations or guaranteeing an initial use of the multifunction peripheral 200. The tutorial loading is configured to be applicable only once per service contract or purchase of a multifunction peripheral 200 for the reasons described above. Tutorial loading information indicates whether the tutorial loading has already been applied. The tutorial loading information is included in the order information described above.

Further, the physical device PD manages individual device information on the multifunction peripheral 200 associated with the physical device PD as a data table. The individual device information to be managed includes various information related to the mechanical status of a single multifunction peripheral 200, and specifically information on the loaded sheet balance information, consumable information, and abnormality information. The loaded sheet balance information is used to manage the remaining number of printable sheets among the number of permitted printing sheets loaded for the multifunction peripheral 200. The consumable information is used to manage the current residual quantities and statuses of consumables such as ink cartridges in the multifunction peripheral 200. The abnormality information is used to manage unauthorized operations on the multifunction peripheral 200 or abnormalities and failures that have occurred on the multifunction peripheral 200.

Each of the MFP identification information 134 stored in the physical device PD and the service information associated with the logical device LD is an example of the device information. Each of the point information and the coupon information is an example of the benefit information.

3. Sequences in which the New and Former Users are Different and the Same

In the printing system 1 according to the present embodiment, the multifunction peripheral 200 is newly set up by the management server 100. The sequence of specific processes for each of a case in which the multifunction peripheral 200 is set up by a user different from the former user and a case in which the multifunction peripheral 200 is set up by the same user as the former user will be described below with reference to FIGS. 4 through 12.

Figure 4:
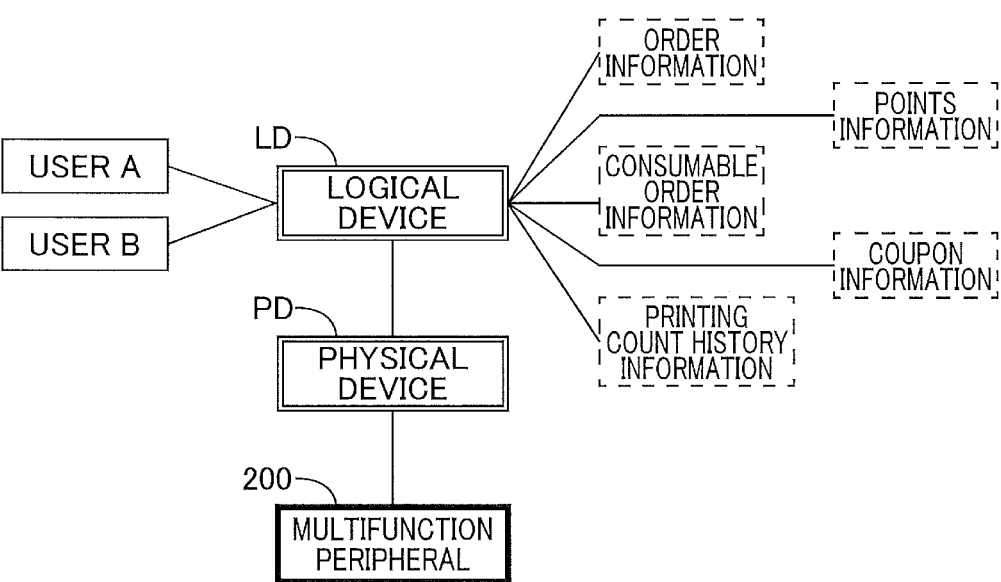
FIGS. 4-8 are explanatory diagrams illustrating a sequence of processes to setup a multifunction peripheral when a new user different from the old user instructs execution of the setup.

3-1. When the Multifunction Peripheral is Set Up by a Different User from the Former User First, the case in which a user different from the former user sets up the multifunction peripheral 200 will be described. FIG. 4 shows an example in which a user A and a user B can both use the multifunction peripheral 200. As shown in FIG. 4, the management server 100 generates a logical device LD and a physical device PD corresponding to the multifunction peripheral 200 and associates the users A and B with the logical device LD. The logical device LD is also associated with order information, consumable order information, printing count history information, points information, coupon information, and the like. The multifunction peripheral 200 and the physical device PD are associated by a device ID. Here, the device ID is also stored in the multifunction peripheral 200 and the device ID stored in the multifunction peripheral 200 is varied each time the multifunction peripheral 200 is reset.

Figure 5:
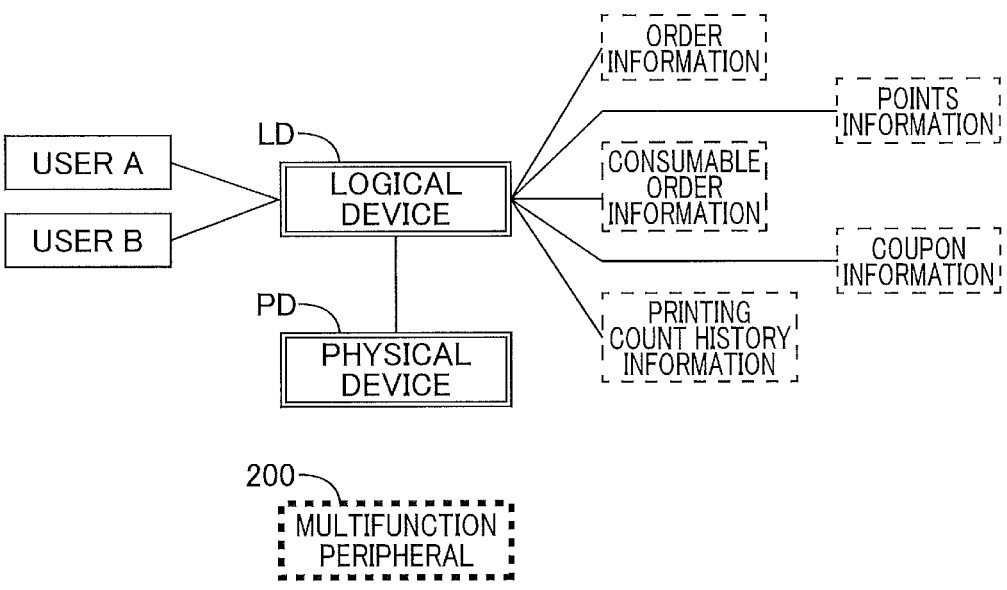

Next, it will be assumed that a problem occurred on the multifunction peripheral 200 and, in response to instructions from a support staff or the like, either user A or user B executes a reset of the multifunction peripheral 200. In this case, the device ID in the multifunction peripheral 200 is initialized so that the device ID in the multifunction peripheral 200 does not match the device ID stored in the physical device PD, breaking the association between the multifunction peripheral 200 and the physical device PD, as shown in FIG. 5. In this state, the management server 100 is unable to communicate with the multifunction peripheral 200 and does not know whether the multifunction peripheral 200 has been reset.

Figure 6:
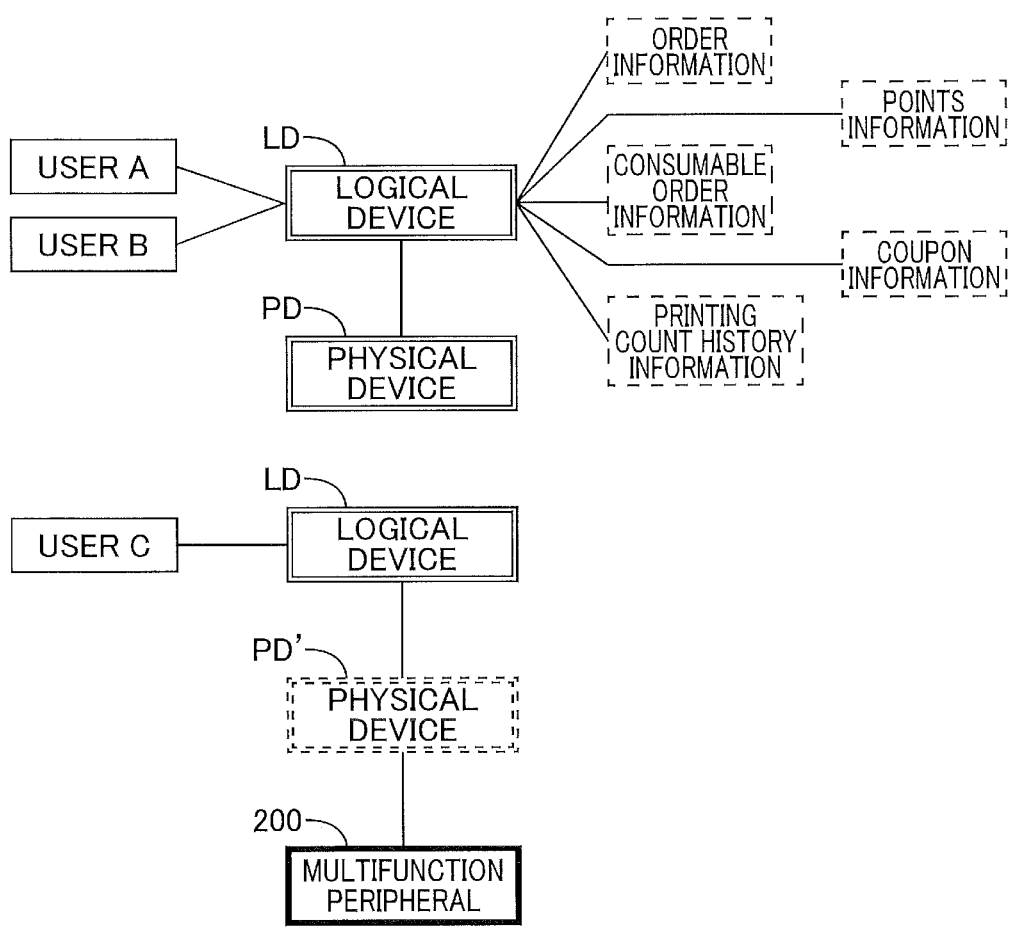

Next, assume that the reset multifunction peripheral 200 is transferred from the users A and B to a user C, and user C sets up the multifunction peripheral 200. Here, "set up" refers to the process of connecting the multifunction peripheral 200 to the management server 100 to be able to communicate with the management server 100 and requesting the management server 100 to perform a process (a setup process, or simply referred to as "setup") to configure or reconfigure a logical device LD and a physical device PD. As shown in FIG. 6, the management server 100 acquires the MFP identification information and the like from the multifunction peripheral 200 requesting the setup, generates a logical device LD corresponding to the multifunction peripheral 200 based on this MFP identification information and generates a provisional physical device PD'. The management server 100 also associates the new user C with the logical device LD and associates the provisional physical device PD' and the multifunction peripheral 200 using the device ID included in the MFP identification information. The management server 100 generates the provisional physical device PD' including the logical device ID based on the acquired MFP identification information, but not including the product ID. The device ID is used for an always-on connection and is newly generated each time the multifunction peripheral 200 is reset. The multifunction peripheral 200 may generate the device ID when a setup is requested or when the multifunction peripheral 200 is restarted.

Figure 7:
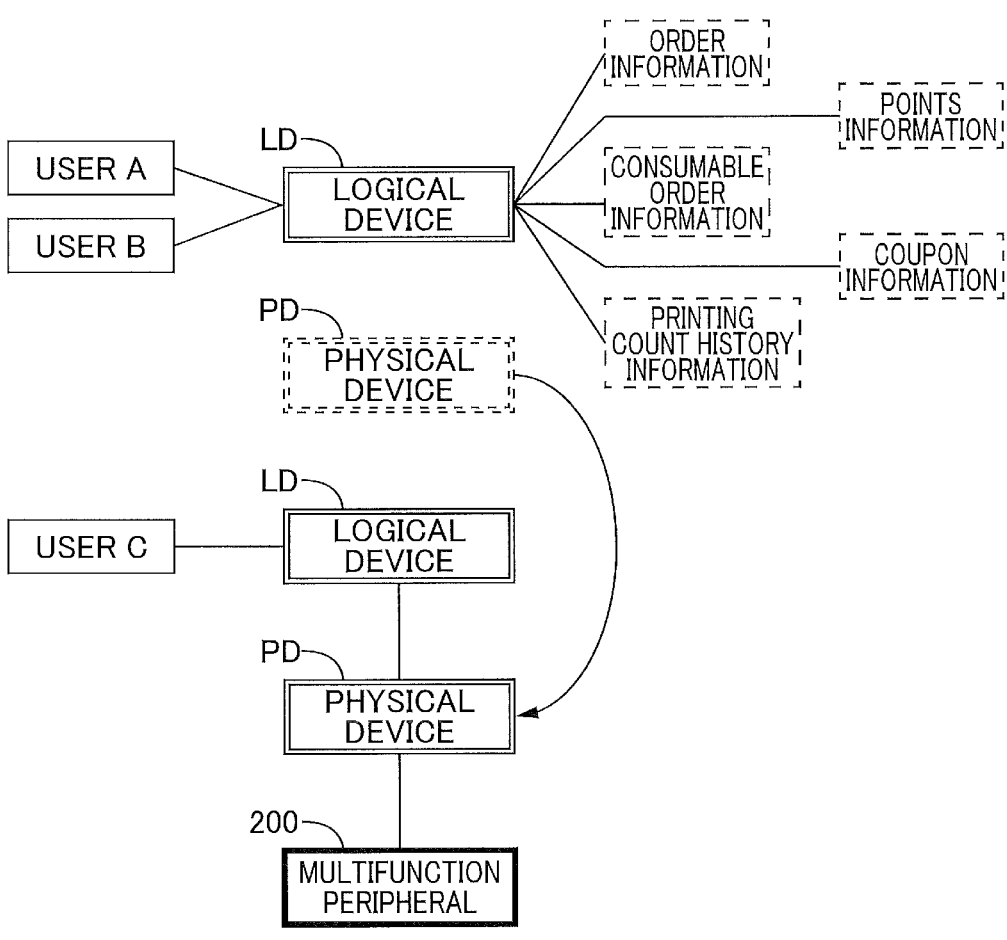

After the multifunction peripheral 200 has been newly set up, the management server 100 determines whether the product ID included in the MFP identification information is already stored in the nonvolatile storage 130. This determination may be made by determining whether there is any physical device PD including the product ID included in the acquired MFP identification information. Alternatively, each time the processor 110 of the management server 100 receives new product ID or MFP identification information including the new product ID is received from each of peripheral devices such as the multifunction peripheral 200, the processor 110 may store, in an area different from an area for storing the physical device PD of the nonvolatile storage 130, a new product ID when the, and the determination described here is made by referring to this product ID in the nonvolatile storage 130. When the product ID for a newly set up multifunction peripheral 200 is stored in the nonvolatile storage 130, the management server 100 determines that an existing multifunction peripheral 200 has been reset. In this case, the management server 100 updates the logical-physical association information, which has specified the association between the physical device PD and the old logical device LD corresponding to the users A and B, so that the updated logical-physical association information specifies the association between the physical device PD and the new logical device LD corresponding to the user C. That is, the provisional physical device PD' is replaced with the physical device PD, as illustrated in FIG. 7. In this way, information associated with the physical device PD, such as the loaded sheet balance information, consumable information, and abnormality information, is passed on to the newly set-up multifunction peripheral 200. Further, the new device ID is recorded in the physical device PD replacing the provisional physical device PD'.

The management server 100 also identifies the physical device PD from the product ID stored in the nonvolatile storage 130 (or from the product ID of the physical device PD) that matches the product ID in the acquired MFP identification information, and identifies the old logical device LD associated with this physical device PD. The old logical device LD may be identified by identifying the logical device LD from the logical-physical association information before update is performed. Further, the management server 100 identifies the user A and user B from the user accounts associated with the identified old logical device LD. This identification may be made by referring to the user-logical device association information associating the account with the logical device LD stored in the nonvolatile storage 130. The management server 100 then compares the identified user accounts with the user accounts for the newly set up multifunction peripheral 200 and determines whether the user accounts match. Because the users A and B are different from the user C in the example shown in FIGS. 6 through 8, the management server 100 determines that the user accounts do not match.

Figure 8:
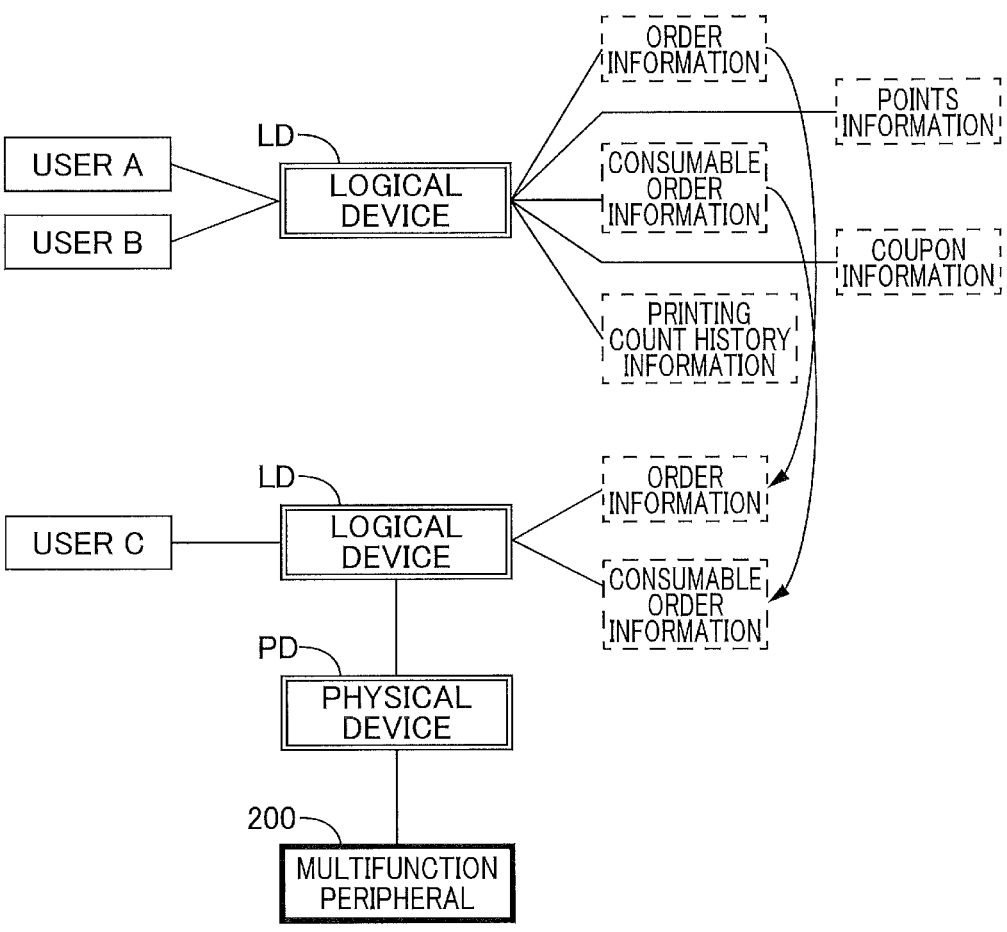

In this case, the management server 100 transfers some of the service information managed by the old logical device LD associated with users A and B to the new logical device LD associated with the user C, as illustrated in FIG. 8. The portion of transferred service information is the minimum required information that enables the new user to properly use the transferred multifunction peripheral 200 to the extent that any harm to the former users can be prevented. Specifically, order history information among the order information for which payment was completed and the purchased amount is loaded is copied to the new logical device LD. At this time, items related to personal information of the former user, such as creator information and payment information included in the order history information, are deleted. Note that order history information for orders for which payment that have not been completed or the purchased amount has not been loaded may or may not be copied to the new logical device LD. The tutorial loading information included in the order information is also copied to prevent the new user receiving the transferred multifunction peripheral 200 from reapplying the tutorial loading.

Order history information for orders whose shipment was completed is also copied to the new logical device LD from the consumable order information, enabling the new user to learn the current residual quantities and statuses of consumables. At this time, personal information on the former user, such as order IDs and order destination information, is deleted. Note that order history information for orders whose shipment has not been completed are moved to the new logical device LD. This order history information does not include personal information since the orders have not yet been shipped. Other information, such as the printing count history information, points information, and coupon information are not copied or moved to the new logical device LD as a rule. However, validity information included in each of the points information and the coupon information that indicates the usage period or usage conditions is copied or moved to the new logical device LD, enabling the new user to determine whether each of the points and coupons has been used. As an exception, any coupons or the like that have been issued to all users or all multifunction peripherals 200 for a limited period of time may be passed on to the new user by being copied or moved to the new logical device LD. The management server 100 generates new user-logical device association information associating the information on the account (user identification information) of the user C with ID information 133 of the new logical device LD and the service information copied or moved from the service information associated with the old logical device LD.

Note that the management server 100 maintains the old logical device LD to which the users A and B are associated, as well as the service information associated with the old logical device LD, except for the information that was moved as described above. Thus, the user-logical device association information is modified so that the information on the account (the user identification information) for the former user(s) is associated with the ID information 133 of the old logical device LD and the remaining service information that is not moved. Accordingly, the users A and B can continue to reference order information, consumable order information, printing count history information, points information, and coupon information that remain associated with the logical device LD. However, since the association between the old logical device LD and the multifunction peripheral 200 has been severed, the service information remained for the former user will not be further updated. The management server 100 may also delete any information that the former user does not need to reference once information has been copied to the new logical device LD, or the former user or new user may be allowed to select whether to keep or delete the data.

3-2. When the Multifunction Peripheral is Set Up by the Same User as the Former User Next, a case in which the multifunction peripheral 200 is set up by the same user as the former user or one of the former users will be described. As in the example of FIGS. 4 and 5 described above, this case will assume that the multifunction peripheral 200 is reset while the user A and the user B are able to use the multifunction peripheral 200, i.e., while the users A and B are associated with the logical device LD.

Figure 9:
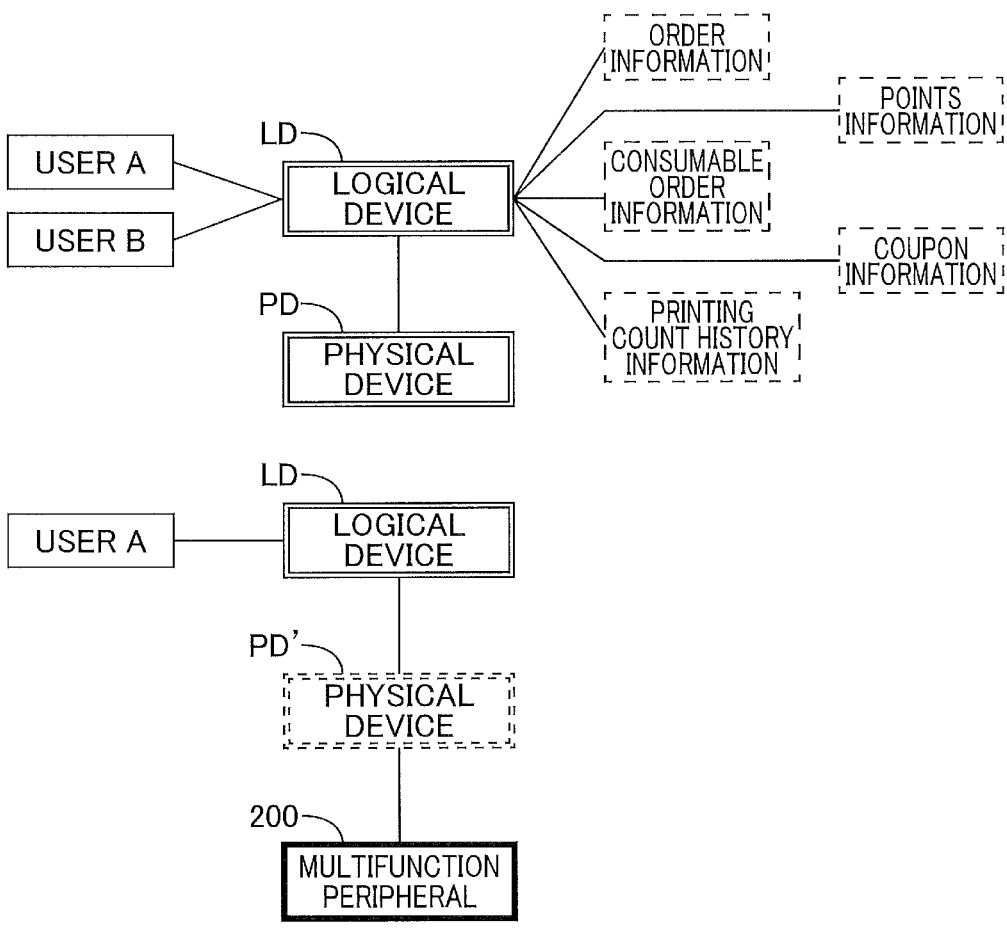
FIGS. 9-12 are explanatory diagrams illustrating a sequence of processes to setup the multifunction peripheral when a new user the same as the old user instructs execution of the setup.

Once the multifunction peripheral 200 has been reset, the user A sets up the multifunction peripheral 200 again. As shown in FIG. 9, the management server 100 acquires the MFP identification information and the like from the multifunction peripheral 200 requesting to be set up, generates a logical device LD corresponding to the multifunction peripheral 200 based on this MFP identification information, as well as a provisional physical device PD'. The management server 100 also associates the user A with the logical device LD and associates the provisional physical device PD' with the multifunction peripheral 200 using the device ID included in the MFP identification information.

Figure 10:
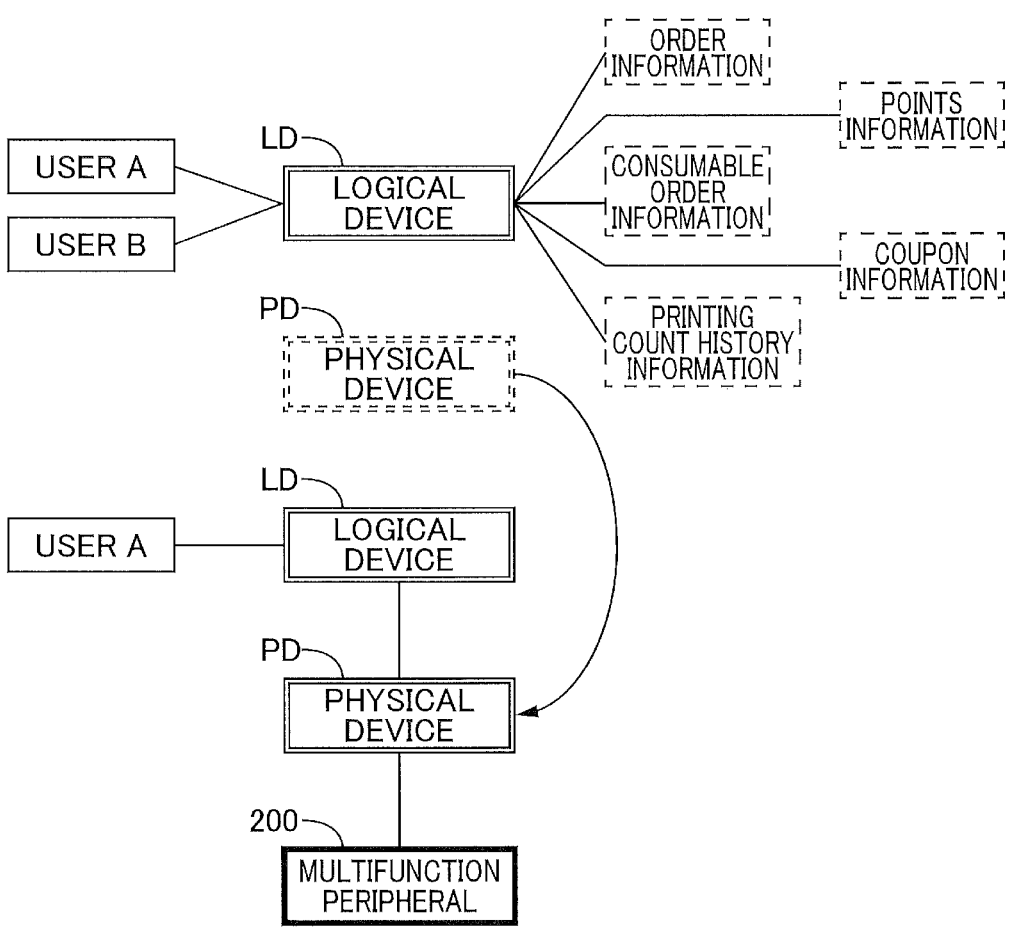

Next, the management server 100 determines based on the product ID included in the MFP identification information acquired from the newly set up multifunction peripheral 200 whether this product ID is already stored in the nonvolatile storage 130. When the product ID for the newly set up multifunction peripheral 200 is already stored in the nonvolatile storage 130, the management server 100 determines that an existing multifunction peripheral 200 has been reset. In this case, the management server 100 modifies the logical-physical association information, which has specified the association between the physical device PD and the old logical device LD corresponding to the users A and B, so that the modified logical-physical association information specifies the association between the physical device PD and the new logical device LD corresponding to the user A. That is, the provisional physical device PD' is replaced with the physical device PD, as illustrated in FIG. 10. As a result, information associated with the physical device PD, including the loaded sheet balance information, consumable information, and abnormality information is passed on to the reset multifunction peripheral 200. Further, the new device ID is recorded in the physical device PD replacing the provisional physical device PD'.

The management server 100 also identifies the physical device PD from the product ID stored in the nonvolatile storage 130 that matches the product ID in the acquired MFP identification information, and identifies the old logical device LD associated with that physical device PD. The management server 100 further identifies the users A and B from the user accounts associated with the identified logical device LD. The management server 100 then compares the identified user accounts to the user accounts for the newly set up multifunction peripheral 200 and determines whether the user account for the new user match at least partially the user account(s) for the former user(s). Since the new user A is included among the former users A and B in the example shown in FIGS. 9 through 12, the management server 100 determines that the user accounts match at least partially.

Figure 11:
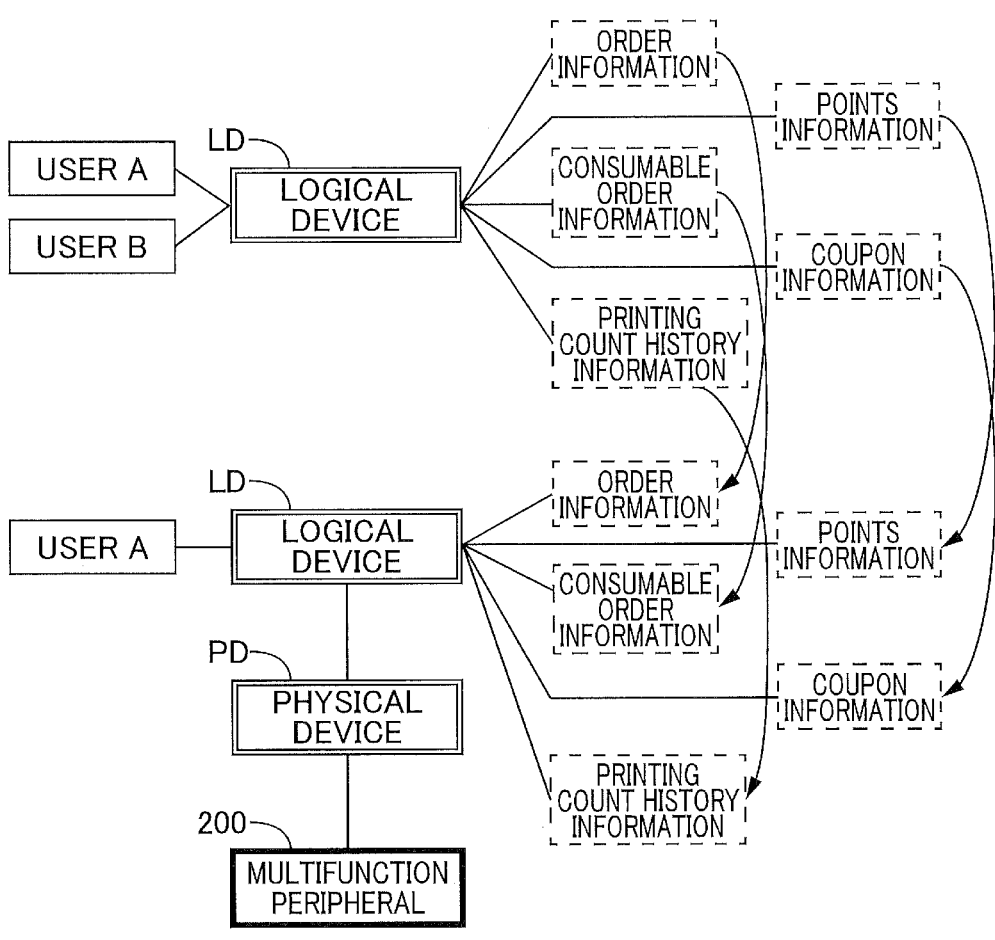

In this case, the management server 100 transfers all service information associated with the old logical device LD that corresponds to the users A and B to the new logical device LD corresponding to the user A, as illustrated in FIG. 11. Specifically, the management server 100 copies or moves all content of the order information, consumable order information, printing count history information, points information, and coupon information to the new logical device LD. At this time, personal information included in the order information and consumable order information is also copied. Among the consumable order information, the order history information of orders for which shipment was completed is copied to the logical device LD and order history information of orders for which shipment has not been completed is moved to the logical device LD. The printing count history information, points information, and coupon information are all moved to the new logical device LD. The management server 100 generates new user-logical device association information associating the information on the account (user identification information) of the user A with ID information 133 of the new logical device LD and the service information copied or moved from the service information associated with the old logical device LD.

Figure 12:
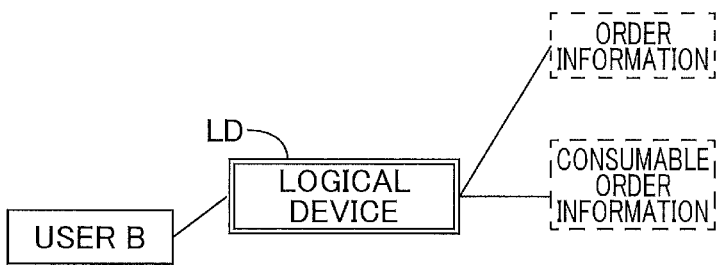
Figure 12:
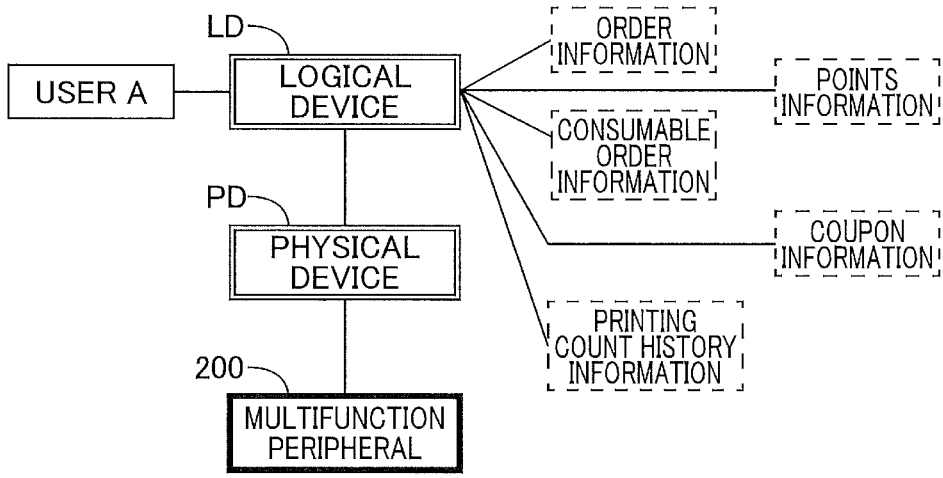

In this state, two multifunction peripherals 200 could be displayed on the information terminal 300 of the user A based on the two logical devices LD if the user A would remain associated with both the old logical device LD and the new logical device LD. However, this will reduce operability because only the multifunction peripheral 200 associated with the new logical device LD is valid. Therefore, the management server 100 breaks the association between the user A and the old logical device LD, by deleting the user identification information of the user A in the user-logical device association information, as illustrated in FIG. 12. This allows only the valid multifunction peripheral 200 associated with the new logical device LD to be displayed on the information terminal 300 of the user A.

Here, the logical device LD associated with the user B is maintained in the user-logical device association information, as is all service information associated with this logical device LD, except for the information moved as described above. Therefore, the user B can continue to reference the order information, consumable order information, and the like that remain associated with the old logical device LD. However, this service information remained for the user B will not be updated since the old logical device LD has been disconnected from the actual multifunction peripheral. Note that information that the former user does not need to reference may be deleted after copying information to the new logical device LD, or the former user or new user may be able to select whether to keep or delete the data.

In the above description, "copy" signifies that the same information is duplicated and associated with the new logical device LD while remaining associated with the old logical device LD, while "move" signifies that the information associated with the old logical device LD is associated with the new logical device LD while removing the association with the old logical device LD. In this case, the information prior to copying and after copying or the information prior to moving and after moving are the same information in terms of content but are not the same exact information since they include changes in associations and the like.

4. Control Procedure Executed by the Management Server

Next, a sample control procedure executed by the processor 110 of the management server 100 according to the present embodiment for implementing the above sequences will be described with reference to the flowchart in FIG. 13.

Figure 13:
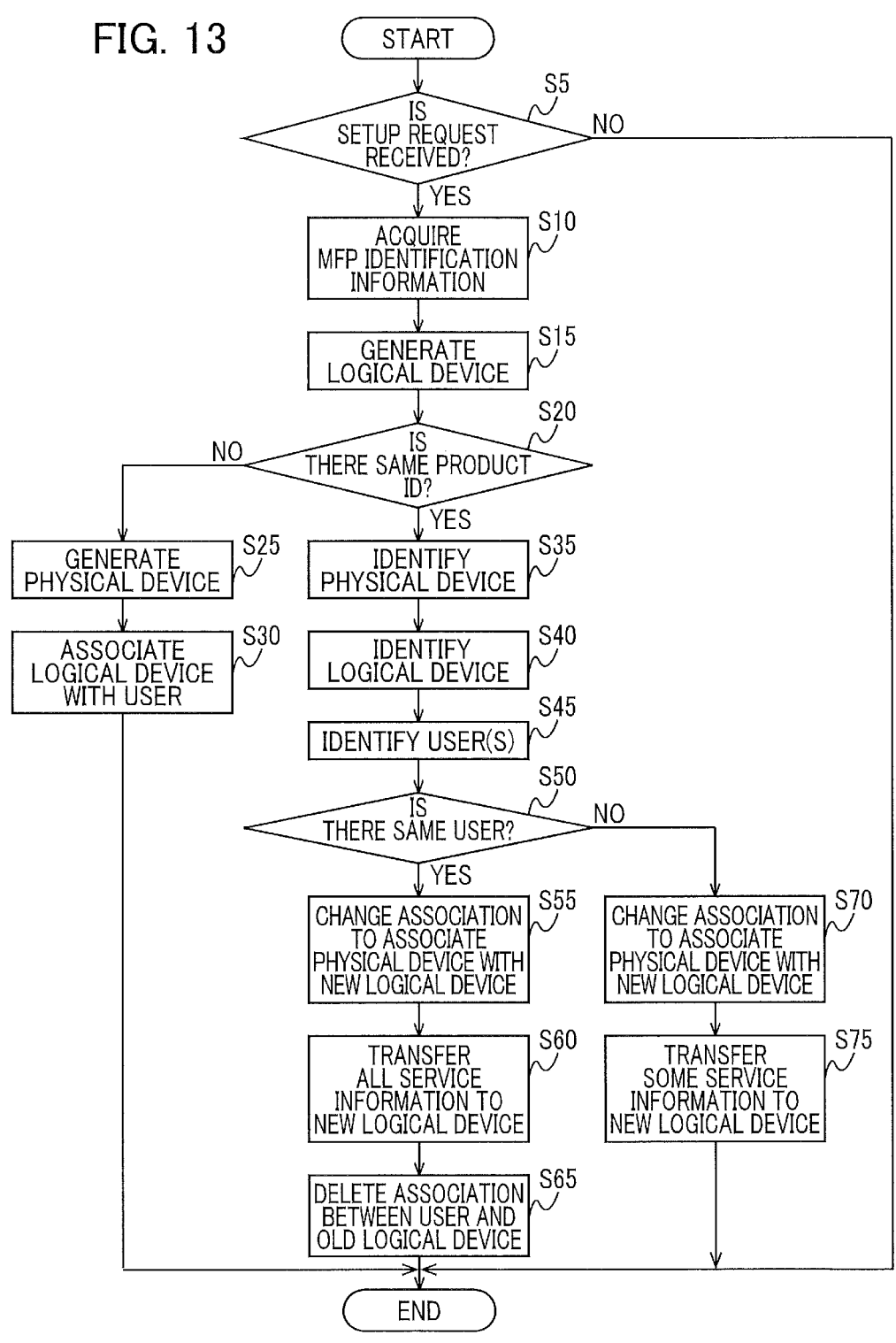
FIG. 13 is a flowchart illustrating a control process executed by a processor of a management server.

In S5 of FIG. 13, the processor 110 determines whether a setup request was received. The multifunction peripheral 200 issues the setup request. Specifically, when the multifunction peripheral 200 receives an instruction to execute a setup from a user's information terminal 300, the multifunction peripheral 200 transmits information on the account of the user issuing the setup instruction and a generated device ID to the management server 100 together with a setup request signal. The process to transmit the setup request signal executed by the multifunction peripheral 200 in this case is an example of the first transmission process. When the processor 110 does not receive a setup request signal or the like (S5: NO), the processor 110 ends the process of FIG. 13. However, when a setup request signal and the like are received (S5: YES), the processor 110 advances to S10.

In S10 the processor 110 acquires MFP identification information and the like from the multifunction peripheral 200 that was the source of the setup request signal and the like. As described above, the MFP identification information includes a product ID and a device ID.

In S15 the processor 110 generates a logical device LD for the multifunction peripheral 200 based on the MFP identification information and the like acquired in S10. The processor 110 also generates a provisional physical device PD' based on the above MFP identification information and the like and associates this provisional physical device PD' with the logical device LD. The provisional physical device PD' is also associated with the multifunction peripheral 200 by the device ID.

In S20 the processor 110 determines whether an ID identical to the product ID acquired in S10 is currently stored in the nonvolatile storage 130. For example, this determination may be made by determining whether there is any physical device PD including the product ID included in the acquired MFP identification information. When the processor 110 determines that the same product ID is not stored in the nonvolatile storage 130 (S20: NO), the processor 110 advances to S25.

In S25 the processor 110 generates a physical device PD based on the MFP identification information and the like acquired in S10 and associates this physical device PD with the logical device LD. In other words, the provisional physical device PD' generated in S15 is finalized while recording the product ID as well as the new device ID, and the provisional physical device PD' is reflected as the original physical device PD. This physical device PD and the multifunction peripheral 200 are associated by the device ID.

In S30 the processor 110 associates the generated logical device LD with the account for the user that issued the setup instruction based on the account received in S5. This association may be made by storing new user-logical device association information in the data management table 132, for example. As a result, the MFP identification information is associated with the user's account and stored in the data management table 132 of the nonvolatile storage 130. Service information related to the provision of services for this multifunction peripheral 200 and the user is managed in association with the logical device LD generated above. Subsequently, the processor 110 ends the process of FIG. 13. Step S30 may be specifically executed when the administrator of the multifunction peripheral 200 has been registered in an administrator registration process executed after the multifunction peripheral 200 was set up.

On the other hand, when the processor 110 determines in S20 that the same product ID is stored in the nonvolatile storage 130 (S20: YES), the processor 110 advances to S35.

In S35 the processor 110 identifies a physical device PD corresponding to the product ID stored in the nonvolatile storage 130 that is identical to the product ID acquired in S10. The processor 110 may identify the physical devices PD that stores the product ID acquired in S10.

In S40 the processor 110 identifies the logical device LD associated with the physical device PD identified in S35. This identification may be made by referring to the logical-physical association information.

In S45 the processor 110 identifies one or more accounts of one or more users associated with the logical device LD identified in S40. This identification may be made by referring to the user-logical device association information. The series of processes of S35-S45 is an example of the extraction process.

In S50 the processor 110 compares the accounts of one or more users identified in S45 with the user's account received in S5. The processor 110 then determines whether the identified one or more associated accounts at least partially matches the user's account received in S5, that is, whether the user's account received in S5 is included in one or more user accounts identified in S45. When the user accounts at least partially match, that is, the account received in S5 is included in one or more user accounts identified in S45 for one logical device LD (S50: YES), the processor 110 determines that the users are the same (S50: YES) and advances to S55.

The process of S50 is an example of the comparing process. The series of process of S20 and process of S35-S50 is an example of the determination process and an example of the determining step. The case that the users are determined to be the same is an example of the case that the association is already stored.

In S55 the processor 110 changes the logical-physical association information that has associated the physical device PD identified in S35 with the logical device LD identified in S40, so that the changed logical-physical association information associates the physical device PD identified in S35 with the new logical device LD generated in S15 in place of the old logical device LD identified in S40. As a result, the provisional physical device PD' generated in S15 is replaced with the physical device PD.

In S60 the processor 110 transfers all service information associated with the old logical device LD identified in S40 to the new logical device LD generated in S15. As a result, the content of service information associated with the user accounts for the old logical device LD is included in the service information associated with the new logical device LD corresponding to the multifunction peripheral 200 that was the source of the setup request. At this time, the device ID received via the interface 190 in S10 is recorded together with the product ID in the physical device PD that was reassociated with the new logical device LD in S55. The process of S60 is an example of the first process and step.

In S65 the processor 110 deletes the user identification information of the user account received in S5 from the user-logical device association information associating the one or more accounts of the one or more users including the user that executed the setup instruction with the old logical device LD identified in S4. Accordingly, the user of the account received in S5 is not associated with the old logical device LD identified in S4. When the user-logical device association information associates only the that executed the setup instruction with the old logical device LD identified in S4, the processor 110 may delete this user-logical device association information. This completes the process of FIG. 13.

On the other hand, when the processor 110 determines in S50 that the accounts neither match nor partially match, that is, the received account in S5 is not included in the identified accounts in S45 (S50: NO), the processor 110 advances to S70. The case that the processor 110 determines in S50 that the users are not the same corresponds to the case that association information is not stored and that the device identification information received via the communication interface has already been stored.

In S70 the processor 110 changes the logical-physical association information that has associated the physical device PD identified in S35 with the logical device LD identified in S40, so that the changed logical-physical association information associates the physical device PD identified in S35 with the new logical device LD generated in S15 in place of the old logical device LD identified in S40. As a result, the provisional physical device PD' generated in S15 is replaced by the physical device PD.

In S75 the processor 110 transfers some of the service information associated with the old logical device LD identified in S40 to the new logical device LD generated in S15. As a result, the service information associated with the user's account corresponding to the old logical device LD, excluding prescribed information, is stored in the service information associated with the new logical device LD corresponding to the multifunction peripheral 200 that was the source of the setup request. At this time, the device ID received via the interface 190 in S10 is recorded together with the product ID in the physical device PD that was reassociated with the logical device LD in S70. The prescribed information excluded from the service information described above includes the aforementioned personal information and a portion of the benefits information, such as points information and coupon information. Of the points information and coupon information, information that indicates an expiration of the usage period or an invalid usage condition in the aforementioned validity information is not excluded but is retained. In S75 the processor 110 generates new user-logical device association information associating the information on the account (user identification information) of the user identified in S45 with ID information 133 of the new logical device LD and the service information copied or moved from the service information associated with the old logical device LD. The process of S75 is an example of the second process and step.

5. Effects of the Invention

In the embodiment described above, the management server 100 performs steps S20 through S50 when a user (or ownership) of the multifunction peripheral 200 is changed, a new user issues a setup instruction to the multifunction peripheral 200, and the management server 100 receives the setup request signal from the multifunction peripheral 200. In S20-S50 the management server 100 determines whether information associating the user account of the user that issued the setup instruction with the MFP identification information for the multifunction peripheral 200 is already stored in the nonvolatile storage 130. When the management server 100 determines in S20-S50 that such association information is not stored in the nonvolatile storage 130 and that MFP identification information is already stored in the nonvolatile storage 130, the management server 100 performs step S75. In S75 the management server 100 stores contents of services provided for this multifunction peripheral 200, excluding prescribed information, in the service information for the multifunction peripheral 200 that was the source of the setup request. According to this embodiment, in a case that the new user differs from the former user when the multifunction peripheral 200 was reset, the management server 100 performs the process in S75 to add certain restrictions to what contents of the service information are transferred, thereby suppressing unauthorized use of data by the new user and reducing the complexity of data management.

One of features of the embodiment is that by executing steps S35-S45 and S50 in the above steps S20-S50, the management server 100 can easily determine the identity of the user corresponding to the multifunction peripheral 200 and can determine whether to execute step S60 or step S75 on the basis of the results of this identification.

Another feature of the present embodiment is that the management server 100 can make accurate determination by using the invariable product ID when identifying the user. By storing the device ID together with the product ID in S60 and S75, the management server 100 can smoothly transfer useful information that will still be needed after the user is changed.

Another feature of this embodiment is that the management server 100 excludes personal information for the former user from the information being transferred when the new user following a reset of the multifunction peripheral 200 differs from the former user, thereby preventing any harm to the former user due to unauthorized use of the former user's personal information.

Another feature of the present embodiment is that the management server 100 excludes benefits information such as points information and coupon information from the information being transferred when the new user following the reset of the multifunction peripheral 200 differs from the former user, thereby suppressing the potential for benefits information being transferred to a user for which such information was not originally intended, resulting in the unjustified granting of benefits.

Another feature of this embodiment is that among the benefits information such as points information and coupon information, the management server 100 allows an exception to transferring benefits information for which the usage period has expired or for which the usage conditions indicate the benefits are no longer valid as indicated in the validity information. This allows the new user to receive meaningful information that can be passed on without causing any harm to the former user.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

The above embodiment describes a case in which a prepaid printing service is used as an example of the printing service, but the present disclosure is not limited to this service. For example, the printing service may be a fixed rate printing service (also called a subscription printing service) for which the user pays a fixed rate, provided that the maximum number of permitted printing sheets is not exceeded within a certain time period. In this case, points may be used for printing sheets that exceed the maximum number. Alternatively, the fixed rate may be discounted according to available points, or the points may be used according to another method.

The inkjet method is used for printing in the multifunction peripheral 200. However, an electro photographic method (a laser method) may be used for printing. In such a case, a photosensitive drum and a toner cartridge accommodating toner are examples of the consumable.

The multifunction peripheral 200 is described as an example of the device (the printing device). However, various devices consuming consumables such as a printer, a copier machine, and a scanner machine may be employed as examples of the device (printing device).

The flowchart shown in FIG. 13 does not limit the present invention to steps indicated therein. Steps may be added or deleted, or their order may be rearranged without departing from the scope or technical concept of the invention.

The techniques, configurations, processes described in the above embodiment and modifications may be combined appropriately.

Various modifications other than those described above may be made without departing form the scope of the present invention.

What is claimed is:

1. A device management server comprising:
   a network interface communicable with a device via a network;
   a storage, the storage comprising a non-transitory computer readable medium; and
   a controller configured to perform:
   when a setup request for a setup is received together with first user identification information for a first user that has instructed to issue the setup request and device identification information for the device via the network interface, a determining process to determine whether first association information is stored in the storage, the first association information associating the first user identification information with first device information, the first device information being data stored in the storage, the first device information having a specific data structure compatible with a set of program instructions stored in the storage and corresponding to the device, the set of program instructions being for managing the device, the first device information including the device identification information and first service information, the first service information including a first part relating to a provision of a service for the device and a second part relating to personal information of the first user;
   when the determining process determines that the first association information is stored in the storage, a first process to generate second device information and store second association information in the storage, the second association information associating the first user identification information with the second device information for the device, the second device information having the specific data structure and corresponding to the device, the second device information including the device identification information and second service information, the second service information being identical with the first service information; and
   when the determining process determines that the first association information is not stored in the storage and the device identification information is stored in the storage, a second process to generate third device information and store third association information in the storage, the third association information associating second user identification information with the third device information for the device, the second user identification information being for a second user different from the first user, the third device information having the specific data structure and corresponding to the device, the third device information including the device identification information and third service information, the third service information including the first part of the first service information but excluding the second part of the first service information.

2. The device management server according to claim 1, wherein the determining process includes:
   when device identification information matching the received device identification information is stored in the storage and the stored device identification information is associated with third user identification information stored in the storage, extracting the third user identification information associated with the stored device identification information from the storage;
   determining whether the extracted third user identification information matches the received first user identification information;
   when the extracted third user identification information matches the received first user identification information, a first determining process to determine that the first association information is stored in the storage; and
   when the extracted third user identification information does not match the received first user identification, a second determining process to determine that the first association information is not stored in the storage.

3. The device management server according to claim 2, wherein the received device identification information for the device is invariable identification information for the device,
   wherein the first determining process and the second determining process are both performed on the basis of the received device identification information that is the invariable identification information,
   wherein the first device information further includes variable identification information for the device which varies when the device is reset,
   wherein each of the second device information further includes different variable identification information different from the variable identification information included in the first device information.

4. The device management server according to claim 1, wherein the first service information includes benefit information on provision of benefit related to a consumable for the device,
   wherein the second part of the first service information includes at least part of the benefit information.

5. The device management server according to claim 4, wherein the benefit information includes unavailable-state information indicating that a period of time for the provision of the consumable has expired or that the provision of the consumable is invalid, wherein the first part of the first service information includes the unavailable-state information.

6. A device management system comprising:
a device comprising:
a first controller;
a first storage storing settings information for the device, the first storage comprising a non-transitory computer readable medium;
a first network interface communicable with a network; and
an input interface configured to receive instructions to the device; and
a server comprising:
a second controller;
a second storage, the second storage comprising a non-transitory computer readable medium; and
a second network interface communicable with the device via the network,
wherein the first controller is configured to perform:
when a setup instruction to perform a setup for the device is received from a first user via the input interface, transmitting, to the server via the first network interface, a setup request for the setup together with first user identification information for the first user and device identification information for the device,
wherein the second controller is configured to perform:
when the setup request is received together with the first user identification information and the device identification information via the second network interface, a determining process to determine whether first association information is stored in the second storage, the first association information associating the first user identification information with first device information, the first device information being data stored in the second storage, the first device information having a specific data structure compatible with a set of program instructions stored in the second storage and corresponding to the device, the set of program instructions being for managing the device, the first device information including the device identification information and first service information, the first service information including a first part relating to a provision of a service for the device and a second part relating to personal information of the first user;
when the determining process determines that the first association information is stored in the second storage, a first process to generate second device information and store second association information in the second storage, the second association information associating the first user identification information with the second device information for the device, the second device information having the specific data structure and corresponding to the device, the second device information including the device identification information and second service information, the second service information being identical with the first service information; and
when the determining process determines that the first association information is not stored in the second storage and the device identification information is stored in the second storage, a second process to generate third device information and store third association information in the second storage, the third association information associating second user identification information with the third device information for the device, the second user identification information being for a second user different from the first user, the third device information having the specific data structure and corresponding to the device, the third device information including the device identification information and third service information, the third service information including the first part of the first service information but excluding the second part of the first service information.

7. A non-transitory computer readable storage medium storing a set of program instructions for a data management server, the data management server including a network interface communicable with a device via a network, a storage, the storage comprising a non-transitory computer readable medium; and a controller, the set of program instructions when executed by the controller causing the data management server to perform:
when a setup request for a setup is received together with first user identification information for a first user that has instructed to issue the setup request and device identification information for the device via the network interface, a determining process to determine whether first association information is stored in the storage, the first association information associating the first user identification information with first device information, the first device information being data stored in the storage, the first device information having a specific data structure compatible with a set of specific program instructions stored in the storage and corresponding to the device, the set of specific program instructions being for managing the device, the first device information including the device identification information and first service information, the first service information including a first part relating to a provision of a service for the device and a second part relating to personal information of the first user;
when the determining process determines that the first association information is stored in the storage, a first process to generate second device information and store second association information in the storage, the second association information associating the first user identification information with the second device information for the device, the second device information having the specific data structure and corresponding to the device, the second device information including the device identification information and second service information, the second service information being identical with the first service information; and
when the determining process determines that the first association information is not stored in the storage and the device identification information is stored in the storage, a second process to generate third device information and store third association information in the storage, the third association information associating second user identification information with the third device information for the device, the second user identification information being for a second user different from the first user, the third device information having the specific data structure and corresponding to the device, the third device information including the device identification information and third service information, the third service information including the first part of the first service information but excluding the second part of the first service information.

* * * * *